July 10, 1945. O. BAKKE 2,379,857
WIND WHEEL GENERATOR
Filed May 26, 1944 2 Sheets-Sheet 2
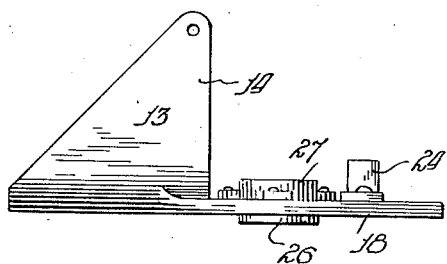
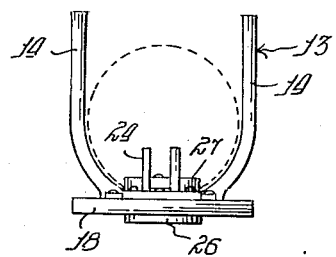
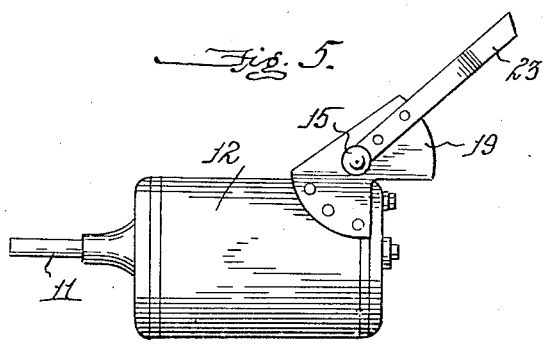
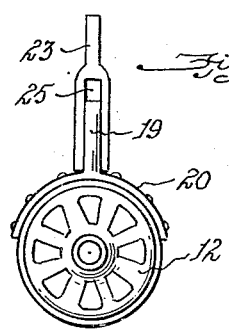
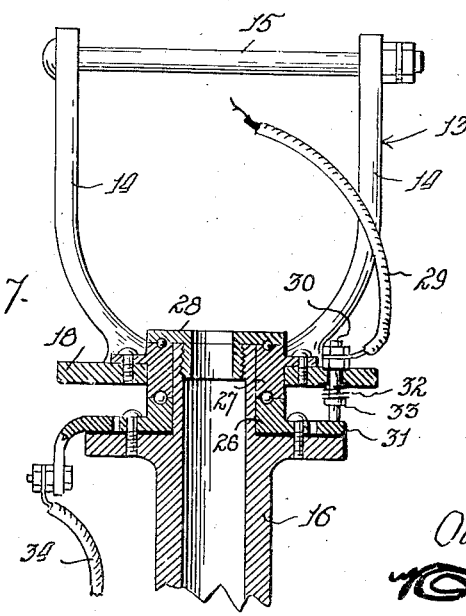
Inventor:-
Olaf Bakke.
Attorney Patented July 10, 1945

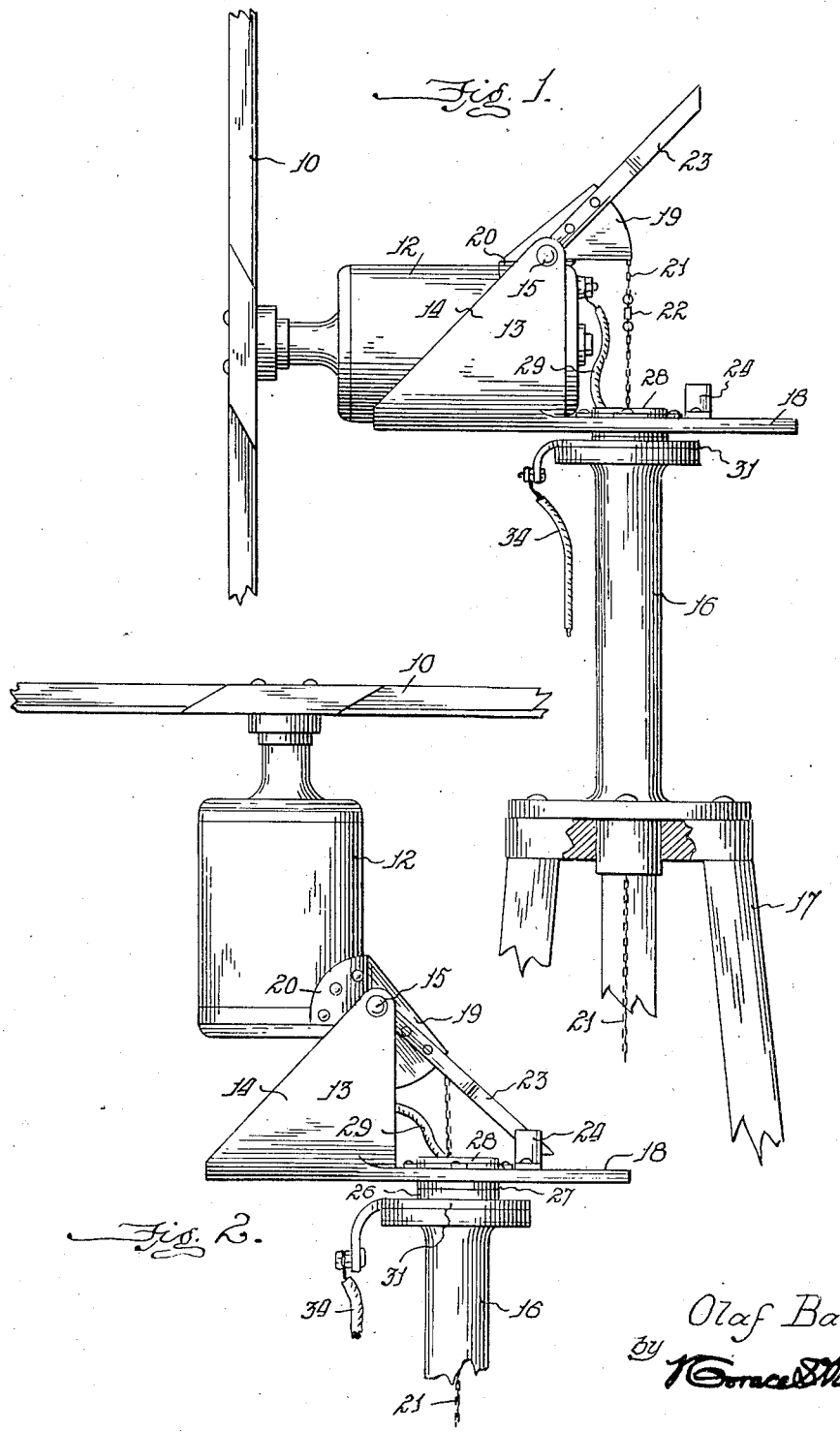

2,379,857

UNITED STATES PATENT OFFICE 2,379,857

WIND WHEEL GENERATOR

Olaf Bakke, De Sart, N. Dak.

Application May 26, 1944, Serial No. 537,455

2 Claims. (Cl. 290—44)

My invention relates to electric generators of that general type in which the motive power is furnished by a wind wheel, and in which the generator and wind wheel carried thereby are mounted on the supporting structure so as to not only turn in respect to changes in the direction of the wind but the force of the wind against the wheel will cause the latter to tilt to a more or less extent and thereby regulate the speed of operation of the generator. For this purpose the wind wheel is associated with the generator and the latter is pivoted on a horizontal axis above the center of gravity so that the movable or tilting elements will assume a balance responsive to the force of the wind as well as turn in responding to any change in the direction of the wind.

The principal object of my invention is to provide a wind wheel generator of this character that involves a construction and arrangement of parts for operation in a simple and effective manner as well as provide for conducting the electric current from the movable generator and its support to the stationary supporting structure, including a turntable and electric wiring connections between the movable and stationary structures; as hereinafter fully described and more specifically set forth in the appended claims.

In the accompanying drawings:

Fig. 1 is a side elevation of a wind wheel generator constructed in accordance with my invention.

Fig. 2 is a similar view with the wind wheel and generator tilted to inoperative position.

Figs. 3 and 4 are detail views of the supporting frame or cradle in which the generator, carrying the wind wheel, is mounted.

Figs. 5 and 6 are detail views of the generator; and

Fig. 7 is an enlarged detail sectional view to illustrate the means by which the cradle is rotatably mounted on the upper end of the stationary supporting structure.

In the type of wind wheel generator to which my invention relates it is customary to have the wind wheel 10 fixed to the shaft 11 of the generator 12 and support the latter in such manner that the wind wheel will receive the force of the wind from the rear or generator side and also permit the generator to tilt or swing upwardly for the purpose of regulating the speed of the wind wheel. In this instance I have provided a particular construction of support in the form of a U-shape cradle 13, whereby the generator—carrying the wind wheel—will be firmly seated in its normal position (Fig. 1) in the curved lower portion of the cradle and be permitted to tilt responsive to the force of the wind, for which purpose the generator is pivoted or swung between the upstanding members 14, 14 of the cradle on a transverse bolt 15 above the center of gravity of the generator and wind wheel. The generator is pivoted at the upper part of the rear end thereof between the upstanding members of the U-shape cradle whereby in its normal horizontal position it is firmly supported, and the cradle by closely embracing said generator will offer minimum resistance to the flow of air currents to the wind wheel.

Turnable movement of the cradle on the upper end of tubular standard 16 is provided for by means of a turntable shown in Fig. 7 and hereinafter particularly described, and it will be noted that the tubular standard or column rises from tower 17 at a sufficient height to reduce to an appreciable extent the formation of eddies adjacent the lower part of the wind wheel in the operation of the latter—the axis of the turntable being located immediately in the rear of the cradle by the provision of an extension 18 thereon. As hereinbefore stated the lower part of the cradle is curved laterally to correspond approximately with the shape of the cylindrical casing of the generator, and as the generator and wind wheel associated therewith are disposed at one side of the vertical axis of the turntable they will freely turn—under the influence of a light wind—to direct the force of the wind against the wind wheel from the generator side thereof.

The tilting of the generator and wind wheel carried thereby is responsive to the force of the wind to regulate the speed of the wind wheel, and when tilted or swung to the horizontal position shown in Fig. 2 it is inoperative—occasioned by an exceedingly strong wind. However, in order to position the wind wheel in inoperative position manually—preliminary to an approaching storm or other contingency—I provide the generator with a rearwardly and upwardly projecting arcuate plate 19 attached to the generator casing by an oppositely curved base 20, and to the extremity of the plate fastening a chain 21 which may extend to the base of the standard or tower for convenient operation by a lever (not shown), and including means for holding the wind wheel out of operation. To prevent the chain from twisting or kinking by turning of the cradle and parts carried thereby an ordinary form of turnbuckle 22 is employed, and for limiting the upward tilting movement of the generator and wind wheel—beyond the horizontal position—an arm 23 is attached to and projects from the arcuate plate so that its outer end will be received in a bracket 24 on the cradle extension 18. This stop arm is provided with parallel members at its lower end to straddle the arcuate plate and leave an opening 25 (Fig. 6) for the passage of the chain directly into the upper end of the tubular standard.

It is necessary that the cradle turn freely on the upper end of the supporting standard or column, and that suitable means be provided for wiring the tilting and turnable generator to the stationary standard from which the current may be conducted, hence I have provided the particular form of turntable and wiring connections illustrated in Fig. 7, in which the turntable comprises collars 26, 27—with interposed ball bearings—bolted to the standard and cradle extension respectively, and employ a cap 28 threaded into the upper end of the tubular standard to hold the parts together for turnable movement of the cradle on the upper end of the standard. The wiring from the generator is effected in this instance by extending wire 29 from the generator to an electric connector post 30 passing through the extension 18 of the cradle so as to be in constant contact with a ring 31 on the upper flanged end of the tubular standard and to which wire 34 is connected for conducting the current away from the wind wheel generator to any point where it is to be used; it being understood, of course, that the electric connections are insulated from the metal parts, as indicated in the drawings. Furthermore, to insure proper electric contact between the post and ring a spring 32 is interposed between the cradle extension and a collar 33 near the lower end of the post, and it will be noted that for convenience of illustration the post 30 and wire connection 34 are disposed diametrically opposite each other in Fig. 7, while in Figs. 1 and 2 they are at right angles to each other—with the post on the far side of the turntable element 27.

By the particular arrangement of the wire connections and pull chain these parts of the wind wheel generator are unaffected by the turning of the cradle and movement of the generator and wind wheel carried thereby; that is, the turning of the wind wheel generator on the upper end of the tubular standard will not twist the pull chain, on account of the turn-buckle, and the electric current generated is conducted from the rotatable cradle to the stationary support on which it is mounted—an important desideratum in wind wheel generators of this type.

The operation of the wind wheel generator constructed in accordance with my invention will be obvious from the foregoing description in connection with the accompanying drawings; for in normal operative position the wind wheel and generator are in the position shown in Fig. 1 so that the wind wheel will revolve by the wind approaching the same from the generator side thereof, and as the force of the wind increases the generator will tilt or swing upwardly to a more or less extent thus regulating the speed of the same—the cradle turning responsive to the direction of the wind. During the operation of the generator—through the medium of the wind wheel—the electricity will be conducted by way of wire 29, post 30 and ring 31 to the wire 34. It will be apparent, also, that the construction and arrangement provide an inexpensive form of wind wheel generator in which the parts are not likely to get out of order.

I claim:

1. A wind wheel generator comprising a generator and wind wheel associated therewith for operation of the generator, a U-shape cradle approximating the length of the generator with the lower portion of said cradle curved transversely approximating the shape of the lower portion of the generator casing firmly seated therein in normal position, said supporting cradle offering minimum resistance to the flow of air to the wind wheel and having upstanding spaced apart side members between which the generator is pivoted at the upper part of the rear end thereof by a bolt extending between the side members to permit tilting movement of the generator, a rearward extension at the lower end of the cradle, a supporting standard, and a turntable connecting the cradle to the standard, whereby the generator and wind wheel may have a tilting movement in the cradle and the latter is adapted to turn responsive to the direction of the wind; together with wire connections between the generator and standard including a connector post extending through the rearward extension of the cradle, and a ring on the upper end of the supporting standard around the turntable element carried thereby.

2. A wind wheel generator comprising a generator and wind wheel associated therewith for the operation of the generator, a cradle having the lower portion thereof curved transversely approximating the shape of the lower portion of the generator casing and in which the generator is seated in normal position, said cradle having upstanding spaced apart side members between which the generator is pivoted—above the center of gravity of the generator and wind wheel—by a bolt extending between the side members to permit tilting movement of the generator, a rearward extension at the lower end of the cradle, a tubular standard having an annular flange at its upper end, and a turntable connecting the cradle to the upper end of the standard, said turntable comprising collars on the standard and cradle respectively with a retaining cap threaded into the upper end of the tubular standard, whereby the generator and wind wheel may have a tilting movement in the cradle and the latter is adapted to turn responsive to the direction of the wind; together with means for swinging the generator and wind wheel to inoperative position including a plate attached to and extending rearwardly from the generator, and a pull chain attached to the outer end of the plate, and electric connections between the generator and supporting standard including a post extending through the cradle and to which a wire from the generator is connected, and a ring on the aforementioned annular flange for constant contact of the post with said ring.

OLAF BAKKE.